Sept. 13, 1927.  K. ARNSTEIN  1,642,005
AIRCRAFT
Filed Feb. 4, 1925   2 Sheets-Sheet 1

INVENTOR
Karl Arnstein
BY
ATTORNEYS

Sept. 13, 1927.
K. ARNSTEIN
1,642,005
AIRCRAFT
Filed Feb. 4, 1925
2 Sheets-Sheet 2
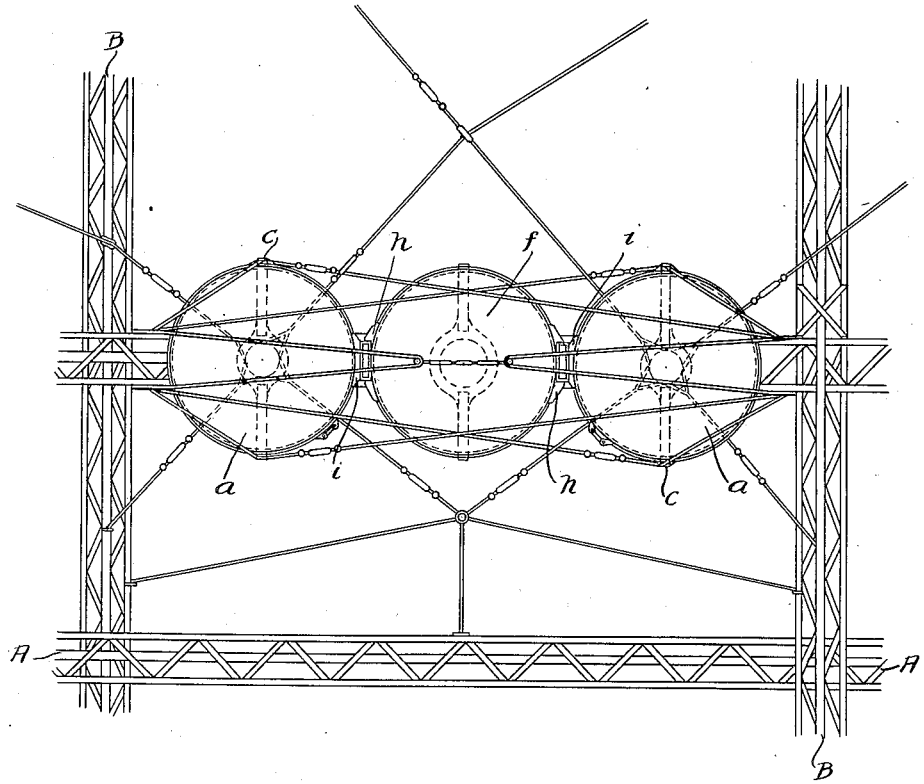
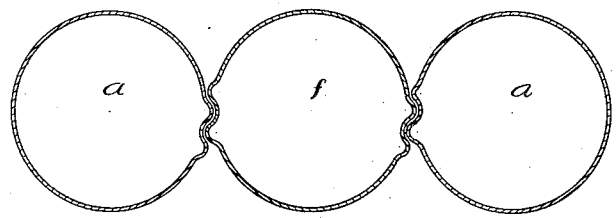
INVENTOR
Karl Arnstein
BY
ATTORNEYS Patented Sept. 13, 1927.

1,642,005

UNITED STATES PATENT OFFICE.

KARL ARNSTEIN, OF AKRON, OHIO, ASSIGNOR TO LUFTSCHIFFBAU ZEPPELIN GESELLSCHAFT MIT BESCHRANKTER HAFTUNG, OF FRIEDRICHSHAFEN, BODENSEE, GERMANY.

AIRCRAFT.

Application filed February 4, 1925. Serial No. 6,683.

My invention relates to tanks in aircraft and more especially to their arrangement and support. The object in view is to provide as light a support as possible. To this end according to my invention I support the tanks from above, and to secure their position I stay them sideways. This is the lightest secure support.

With aircraft it is usual to provide for slipping some of the tanks. Such slip tanks according to my invention are also supported from above but in a manner to allow easy slipping. This forbids the above-mentioned staying. For the purpose of securing the position of such slip tanks I arrange them between other tanks which are securely stayed. It may be of advantage to provide a kind of slide bearings between the fixed tanks and the tank to be slipped, or the walls of such tanks may have grooves and projecting parts respectively, engaging with each other but allowing for vertical sliding. By such arrangement the slip tanks will only be supported by means which provide for slipping and yet they will be secured in their position in relation to the other parts of the aircraft. It will be of advantage to use tension members for supporting and staying the tanks, as this is the lightest way of construction for the purpose.

Having given a general explanation of my invention, I will now point out the details thereof referring to the drawings which represent examples embodying my invention.

Fig. 2 is the corresponding plan view.

Fig. 3 shows another example in horizontal cross section.

Figure 1:
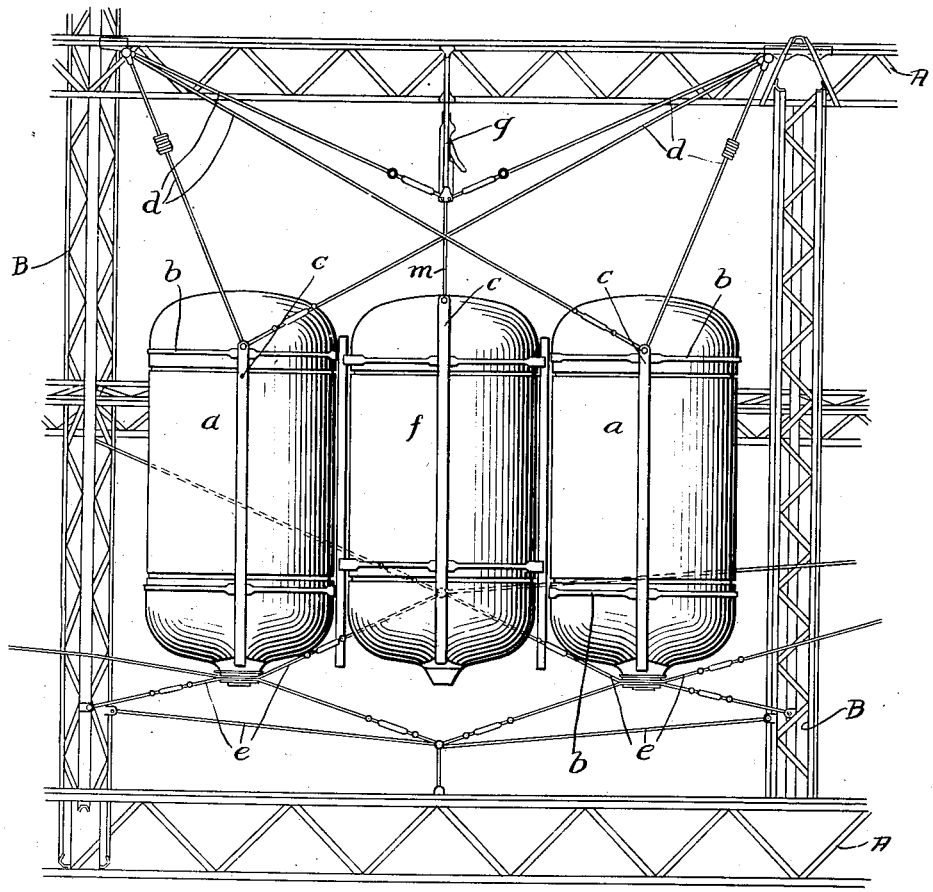
Fig. 1 is the side elevation of a group of these tanks arranged within the gangway framework of an airship; the middle tank is provided for being slipped if so wanted.

The fixed tanks $a$, as shown in Figs. 1 and 2, each have two detachable straps $b$ around their circumference, which are connected with each other by a longitudinal strap $c$ passing also around the lower portion of the tank. Similar straps surround slip tank $f$. Tension members $d$ support the weight of the tanks $a$ and other tension members $e$ serve for staying them. One end of all of these tension members is fastened to the strap $c$ while the other ends are connected to the framework consisting of longitudinal members A and cross members B. Slip tank $f$ is supported by tension member $m$ which is connected to a slipping member $g$. Vertical guide rods $h$ are provided at the sides of the slip tank $f$ which engage with other vertical guide rods $i$ provided at the sides of the fixed tanks $a$. Thus tanks $a$ and $f$ together are supported and secured in position in such a way as to allow slipping of tank $f$ any time after the fuel leadings, which are not shown, have been removed and when the slipping member is operated.

The arrangement may be further simplified by omitting the guide rods $h$ and $i$; this may be obtained by providing longitudinal grooves and projections $o$ in the walls of the tanks, respectively, as shown in Fig. 3.

I want it understood that I do not limit myself to the examples described or shown in the drawings as many variations will occur to those skilled in the art.

What I claim is:

1. In aircraft in combination a structure, two tanks supported from said structure by tension members and stayed in relation to said structure, also by tension members, and a third tank detachably supported from said structure and arranged between said two other tanks so as to be held in position in relation to said two other tanks.

2. In aircraft in combination a structure, two tanks supported from said structure by tension members and stayed in relation to said structure also by tension members, a third tank detachably supported from said structure and arranged between said two other tanks and means for guiding said third tank vertically when slipped.

3. In aircraft in combination a structure, two tanks supported from said structure by tension members and stayed in relation to said structure also by tension members, a third tank detachably supported from said structure and situated between said two other tanks, each of said first two tanks having vertical guiding means along the side of its wall that faces said third tank, said third tank having vertical guiding means along those two sides of its walls that face the other two tanks, respectively, said guiding means engaging with each other.

4. In aircraft in combination a structure, two tanks supported from said structure and stayed in relation to said structure, a third tank inserted between said two other tanks, said third tank also supported from said structure, and held in position in relation to said structure by said first two tanks.

5. In aircraft in combination a structure, two tanks supported from said structure and stayed in relation to said structure, a third tank inserted between said two other tanks, said third tank detachably supported from said structure and held in position in relation to said structure by said first two tanks.

6. In aircraft in combination a structure, two tanks supported from said structure and stayed in relation to said structure, a third tank detachably supported from said structure and inserted between said two other tanks, the walls of each of said first two tanks having a vertical groove along the side that faces said third tank, the walls of said third tank having projections corresponding to and engaging with said grooves in said first two tanks.

7. In aircraft in combination a structure, two tanks supported from said structure and stayed in relation to said structure, a third tank detachably supported from said structure and inserted between said two other tanks, the walls of said third tank having a vertical groove on each side facing one of the other two tanks, the walls of said other two tanks having projections.

KARL ARNSTEIN.